US011280662B2

(12) United States Patent
Stronkhorst

(10) Patent No.: US 11,280,662 B2
(45) Date of Patent: **\*Mar. 22, 2022**

(54) WEIGHING SYSTEM FOR ITEM IN CONTAINER ON CONVEYOR

(71) Applicant: Optimus Sorter Holding B.V., Beuningen (NL)

(72) Inventor: Willem Dagobert Stronkhorst, Beuningen (NL)

(73) Assignee: Optimus Sorter Holding B.V., Beuningen (NL)

( \* ) Notice: Subject to any disclaimer, the term of this patent is extended or adjusted under 35 U.S.C. 154(b) by 621 days.

This patent is subject to a terminal disclaimer.

(21) Appl. No.: 16/319,154

(22) PCT Filed: Jul. 17, 2017

(86) PCT No.: PCT/NL2017/050479
§ 371 (c)(1),
(2) Date: Jan. 18, 2019

(87) PCT Pub. No.: WO2018/016946
PCT Pub. Date: Jan. 25, 2018

(65) Prior Publication Data
US 2021/0333143 A1 Oct. 28, 2021

(30) Foreign Application Priority Data
Jul. 18, 2016 (NL) ...................... 2017181

(51) Int. Cl.
*G01G 11/00* (2006.01)
*G01G 21/23* (2006.01)
(Continued)

(52) U.S. Cl.
CPC ............... *G01G 11/00* (2013.01); *B07C 5/18* (2013.01); *B65G 17/32* (2013.01); *G01G 11/003* (2013.01); *G01G 21/23* (2013.01)

(58) Field of Classification Search
CPC ...... G01G 11/00; G01G 11/003; G01G 11/04; G01G 19/035; G01G 21/23; B07C 5/18; B65G 17/32; B65G 47/766; B65G 47/844
See application file for complete search history.

(56) References Cited

U.S. PATENT DOCUMENTS 1,404,591 A 1/1922 Fredrickson
3,454,614 A 7/1969 Tani et al.
(Continued)

FOREIGN PATENT DOCUMENTS

EP 1733807 B1 12/2006
EP 1972579 A1 9/2008
(Continued)

*Primary Examiner* — Randy W Gibson
(74) *Attorney, Agent, or Firm* — Shewchuk IP Services, LLC; Jeffrey D. Shewchuk

(57) ABSTRACT

A weighing system for weighing an item when being conveyed comprising:
  at least one container for transporting the item;
  a conveyor means for conveying said container in a first vertical direction; and
  a weighing device for weighing the container;
wherein the container is connected to the conveyor means via a primary connecting means and a secondary connecting means, each of them comprising a first section permanently connected to the container, a second section permanently connected to the conveyor means, and a third section hingedly connected to both the first section and the second section;
and wherein the third section of the primary connecting means is rotatable about a first axis transverse to the conveying direction and the third section of the secondary connecting means is rotatable about a second axis parallel to said conveying direction such that the container may move from the first vertical position to a second vertical position.

12 Claims, 8 Drawing Sheets

(51) Int. Cl.
*B07C 5/18* (2006.01)
*B65G 17/32* (2006.01)

(56) References Cited

U.S. PATENT DOCUMENTS

| | | | |
|---|---|---|---|
| 3,918,587 A | | 11/1975 | Drew, Jr. |
| 4,187,945 A | | 2/1980 | Altenpohl et al. |
| 4,957,619 A | * | 9/1990 | Powell, Jr. ................ B07C 5/02 198/443 |
| 5,306,877 A | * | 4/1994 | Tas ........................... B07C 5/18 177/145 |
| 10,577,194 B2 | * | 3/2020 | Stronkhorst ......... B65G 47/844 |
| 10,787,320 B2 | * | 9/2020 | Stronkhorst ........... B65G 35/08 |
| 11,002,590 B2 | * | 5/2021 | Stronkhorst ........... B65G 17/34 |
| 2017/0073172 A1 | | 3/2017 | Kuijpers et al. |
| 2017/0305674 A1 | | 10/2017 | de Bruijn |
| 2018/0038728 A1 | * | 2/2018 | Hendriks .................. B07C 5/18 |
| 2019/0219439 A1 | * | 7/2019 | Stronkhorst ......... G01G 19/035 |

FOREIGN PATENT DOCUMENTS

| | | |
|---|---|---|
| NL | 2013604 B1 | 10/2016 |
| WO | 9833046 A1 | 7/1998 |
| WO | 2016/133398 A1 | 8/2016 |

\* cited by examiner

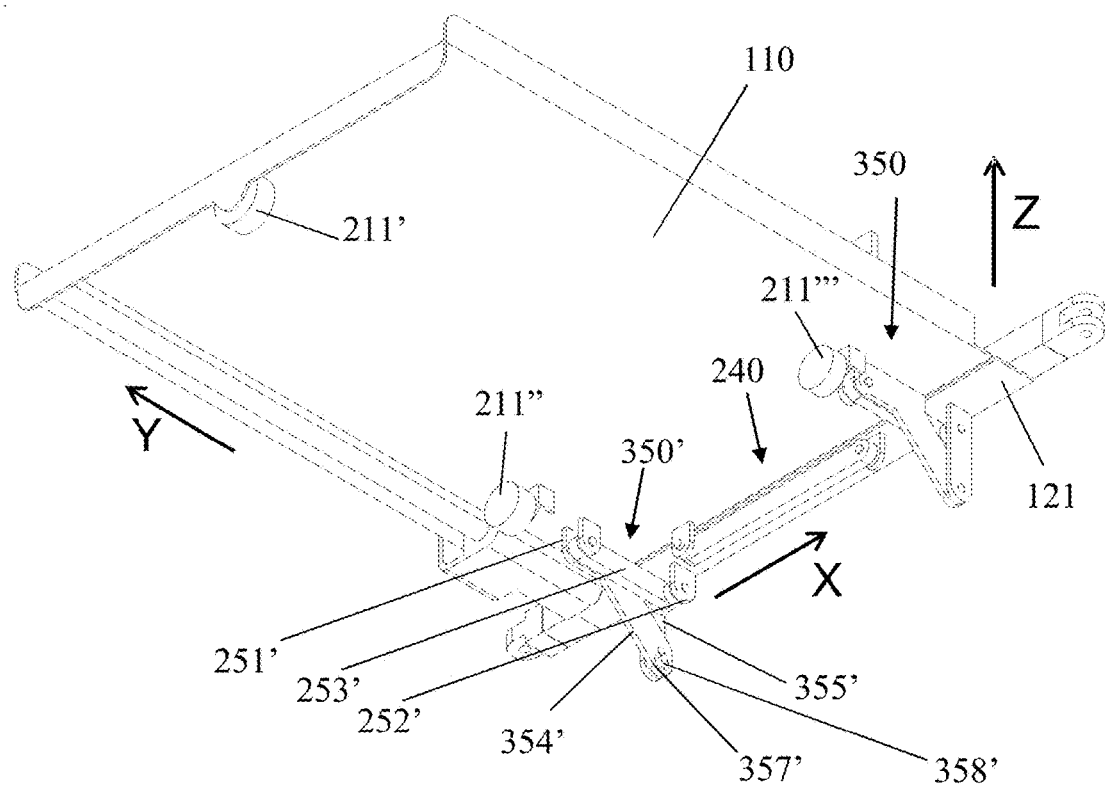
*Fig. 3A*
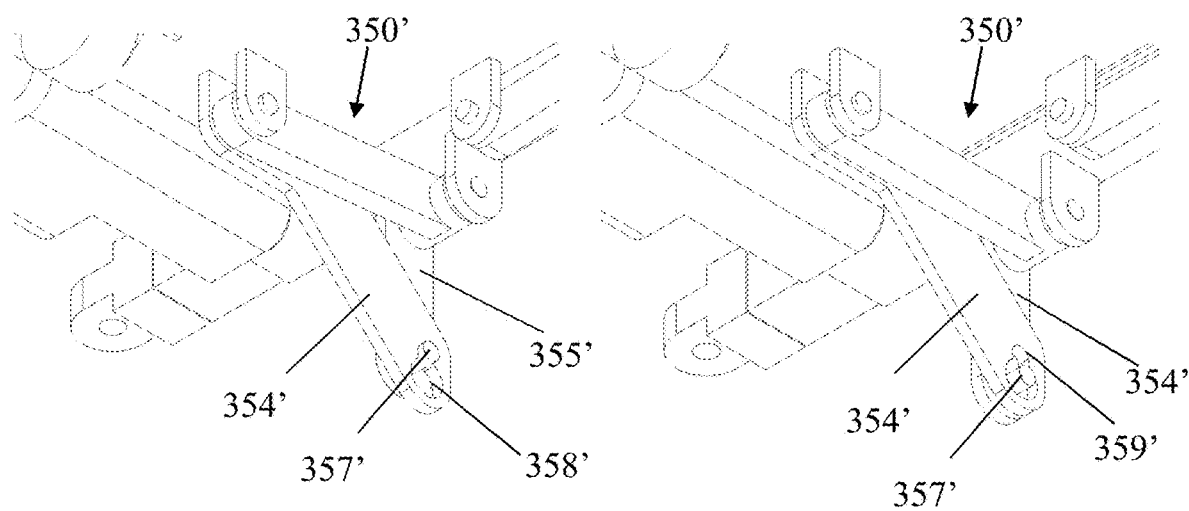
*Fig. 3B*  *Fig. 3C*

WEIGHING SYSTEM FOR ITEM IN CONTAINER ON CONVEYOR

FIELD OF THE INVENTION

The invention is in the field of weighing systems for weighing an item when being conveyed from a receiving section to an outlet section.

BACKGROUND OF THE INVENTION

Weighing systems for weighing an item when being conveyed from a receiving section to an outlet section are known in the art. For example, EP0568763 discloses a weighing system comprising a plurality of containers arranged for transporting the item. The containers are connected to a conveyor means arranged in the weighing system for conveying the containers in a conveying direction. The container is supported by the conveyor means in a first vertical position via a pin of the tray arranged in an recess of the conveyor means. The tray may be lifted to a second vertical position by further means, the lifting being guided by a movement of the pin along the opening defined by the recess. When the tray is in the second vertical position, said tray is supported by a weighing device to weigh the container comprising the item.

A problem of the above mentioned weighing system is that the tray is subjected to vibrations and/or movements when being conveyed in the second vertical position that may decrease the accuracy of the weighing process. It is an object of the present application to alleviate this problem.

SUMMARY OF THE INVENTION

A first aspect of the invention relates to a weighing system for weighing an item when being conveyed from a receiving section to an outlet section, the weighing system comprising:
- at least one container for transporting the item;
- conveyor means connected to the container for conveying in a conveying direction said container at a first vertical position relative to the conveyor mean; and
- a weighing device for weighing the container when said container is being conveyed supported on said weighing device;

wherein the container is connected to the conveyor means via a primary connecting means and a secondary connecting means, each of the two connecting means comprising a first section permanently connected to the container, a second section permanently connected to the conveyor means, and a third section hingedly connected to both the first section and the second section;

and wherein both connecting means are arranged such that the third section of the primary connecting means is rotatable about a first axis transverse to the conveying direction and the third section of the secondary connecting means is rotatable about a second axis substantially parallel to said conveying direction such that the rotation of said third sections about the first axis and the second axis respectively allows for movement of the container with respect to the conveyor means in a vertical direction from the first vertical position to a second vertical position

DETAILED DESCRIPTION OF THE INVENTION

The first aspect of the invention concerns a weighing system according to claim 1. In this way, the weighing system allows for a more accurate weighing of the container and, therefore, of the item transported by the container.

The weighing system according to the invention comprises a primary connecting means and a secondary connecting means for connecting the container to the conveyor means. The container may be thus conveyed in a conveying direction at a first vertical position relative to said conveyor means. The conveying direction defines an axis X.

Each of the connecting means comprises a first section permanently connected to the container, a second section permanently connected to the conveyor means and a third connection hingedly connected to both the first section and the second section, for example via flexure bearings. In this way, the third section of each of the connecting means is capable of rotating for allowing the container to move in a vertical direction along an axis Z from the first vertical position to a second vertical position, which is the position at which the container is weighed when being conveyed on the weighing device. In general, the axis Z is transverse to the conveying direction.

The third section of the primary connecting means is capable of rotating about a first axis and the third section of the secondary means is capable of rotating about a second axis for allowing movement of the container relative to the conveyor means. In this way, the container may move relative to the conveyor means from the first vertical position to a second vertical position. The second vertical position is the vertical position of the container relative to the conveyor means when being conveyed supported on the weighing device due to the load that said container and the item being transported by said container. Thus, the effect that the conveyor means may have when the container is weighed is negligible. Further, when the container moves from the first vertical position to the second vertical position is less subjected to vibrations, since the connecting means are not arranged for sliding but for rotating, even if the container moves in the axis Z due to the weight of the tray when being weighed and the item when being conveyed on the weighing means.

It is preferred that both connecting means connects the container to a conveyor bar arranged in a conveyor chain of the conveyor means such that the bottom section of the container is easily available to be weighed by the weighing device during operation of the weighing system. The first section and the second section of a connecting means may be respectively connected to the top sections of the container and the conveyor bar or the bottom sections of said container and conveyor bar. Plus, the first section and the second section of the primary connecting means may be arranged in said top sections while the first section and the second section of the secondary means and vice versa. In general both connecting means are arranged at the bottom sections.

According to the invention, the primary connecting means and the secondary connecting means are arranged such that the first axis is transverse to the axis X defined by the conveying direction and the second axis is substantially parallel to said axis X. Thus, the connecting means cooperate to convey the container in a stable way, reducing movements of the container along an axis Y transverse to both the axis X and axis Z when said container is being conveyed at the second vertical position. The larger the distance in the conveying direction of the first sections connected to the container, the less movement of the container there is in said conveying direction. Further, the movement of the container along the axis X is also reduced when being conveyed in the second vertical position, while said container may still move in the Z direction.

In an embodiment, for the primary connecting means and the secondary connecting means, the third section is hingedly connected to the first section via a first pin arranged within a first opening and the second section via a second pin arranged within a second opening; wherein for the primary connecting means the first pin and the second pin are arranged transverse to the conveying direction and wherein for the secondary connecting means the first pin and the second pins are substantially parallel to said conveying direction. In this way, the third section of one connecting means may be hingedly connected easily to the first section and the second section of said connecting means. In an example, the third section of one connecting means may comprise the first pin and the second pin that cooperate respectively with the first opening and the second opening arranged in the first section and the second section or vice versa. It is also possible that the third section of one connecting means may comprise the first pin and the second opening or vice versa, the first section and the second section that cooperate with said third section being arranged accordingly for providing the hingedly connection.

In an embodiment, the second opening of the secondary connection means is designed such that said second opening elongates in a third axis transverse to both the first axis and the second axis such that the second pin of said secondary connection means is capable of sliding within said second opening when the container moves between the first vertical position and the second vertical position. In this way, the second pin of the secondary connecting means may slide and rotate within the second opening and the longitudinal dimension of the third section of said secondary connecting means may be reduced while still providing the rotational movement. As consequence, more bottom section of the container is available for being weighed on the weighing device. Further although the sliding movement of the second pin within the second opening may cause friction, said friction is reduced by the primary connecting means since said primary connecting means reduce rotation of the secondary connecting means about the third axis.

In an embodiment, the secondary connecting means comprises a further third section, also hingedly connected to the first section and the second section of said secondary connecting means and in a parallelepiped arrangement with respect to the third section of said secondary connecting means. In this way, the rotation of the container about the axis X is restricted by the conveyor means and the downward effect that the weight of the item being transported may cause to the container when said container is being conveyed in the first vertical position is compensated by the conveyor means, e.g. the conveyor bar.

In an embodiment, at least one of the primary connecting means or the secondary connecting means comprises a fourth section extending from the first section and a fifth section extending from the second section, the fourth section and the fifth section being designed for cooperating together via a further pin and a further opening oversized with respect to the further pin, the further opening also comprising a recess, such that when the container is at the first vertical position the fourth section is supported by the fifth section via the pin fixed within the recess and such that when the container moves towards the second vertical position said fourth section is released from said fifth section as the pin is arranged within the further opening, said second vertical position being higher than the first vertical position; and wherein the weighing system comprises upstream relative to the weighing device a lifting device for moving the container relative to the conveyor means from the first vertical position towards the second vertical position such that said container is conveyed supported on the weighing device in said second vertical position. In this way, the connecting means comprising the fourth section and the fifth section may support the container in the first vertical position, along the axis Z, via the pin fixed within the recess, while said container is being conveyed. The fourth section may comprise the further pin and the fifth section may comprise the oversized further opening and vice versa. The recess is arranged in the oversized opening depending on whether the connecting means in either on the top section or bottom section of the container, the way in which said fourth section and fifth section extend and the vertical movement of the container between the first vertical position and the second vertical position, the conveyor means, etc.

The lifting means may be any device arranged to move the container from the first vertical position towards the second vertical position on the weighing device.

In an embodiment, the lifting device comprises a frame, the frame comprising a receiving area adjacent to the weighing device, said receiving area configured, when the container is being conveyed, for
i. receiving the container in the first vertical position and;
ii. guiding said container upwardly towards the second vertical position such that the further pin is moved out of the recess towards the oversized further opening. In this way, the container may be easily moved from the first vertical position to the second vertical position as being conveyed.

In an embodiment, the weighing system further comprises a setting-down device arranged adjacent to the weighing device, the setting-down device comprising a frame, the frame comprising a setting-down area configured, when the container is being conveyed by the conveyor means, for
i. receiving the container (110) in the second vertical position from the weighing device (160) and;
ii. guiding said container (110) from the second vertical position towards the first vertical position such that the further pin (357) is fixed in the recess. In this way, the container may be easily moved from the second vertical position to the first vertical position as being conveyed.

In an embodiment, the primary connecting means and the secondary connecting means are arranged such that the second section of said primary connecting means is opposite to said secondary connecting means and wherein the container comprises a further secondary connecting means for connecting said container to the conveyor means, the further connecting means being arranged opposite to the first section of the primary connecting means. In this way, the risk of movement of the container within the plane defined by the axes X and Y when the container is being conveyed in the second vertical position is even more reduced. Further, the connecting means allow for a more stable support of the container.

In an embodiment, the container further comprises rolling means for supporting said container on the weighing device and for cooperating with the conveyor means for conveying said container while being supported on the weighing device. In this way, the friction of the container while being conveyed on the weighing device is even lower. It is preferred that the rolling means are detached from the primary connecting means and secondary connecting means.

In an embodiment, the weighing system further comprises guide means arranged in cooperation with the rolling means for supporting said container in the first vertical position when being conveyed. In this way, the friction of the container with the guiding means is reduced, and the risk of movement of the container that said friction may cause prior to be conveyed on the weighing device is reduced. Plus, the guiding means may support and guide the container when being conveyed in the first vertical position towards the weighing device to prevent a rotation of the container about the axis X that might cause dropping of the item being transported.

In a more specific example where at least one of the primary connecting means or the secondary connecting means comprises the fourth section and the fifth section, the guide means is arranged in cooperation with the lifting device such that the receiving area receives the container via the rolling means. Also, the guide means may be arranged in cooperation with the setting-down device such that said guide means receives, from said setting-down area, the container via the rolling means.

BRIEF DESCRIPTION OF THE DRAWINGS

For the purpose of illustrating the invention, the drawings show aspects of one or more embodiments of said invention. However, it should be understood that the present invention is not limited to the precise arrangements and instrumentalities shown in the drawings, wherein:

FIGS. 3A, 3B and 3C is a second example of a container.

DETAILED DESCRIPTION OF THE DRAWINGS

It should be noted that items which have the same reference numbers in different figures, have the same structural features and the same functions. Where the function and/or structure of such item has been explained, there is no necessity for repeated explanation thereof in the detailed description.

It should be noted that the above-mentioned embodiments illustrate rather than limit the invention, and that those skilled in the art will be able to design many alternative embodiments.

Figure 1:
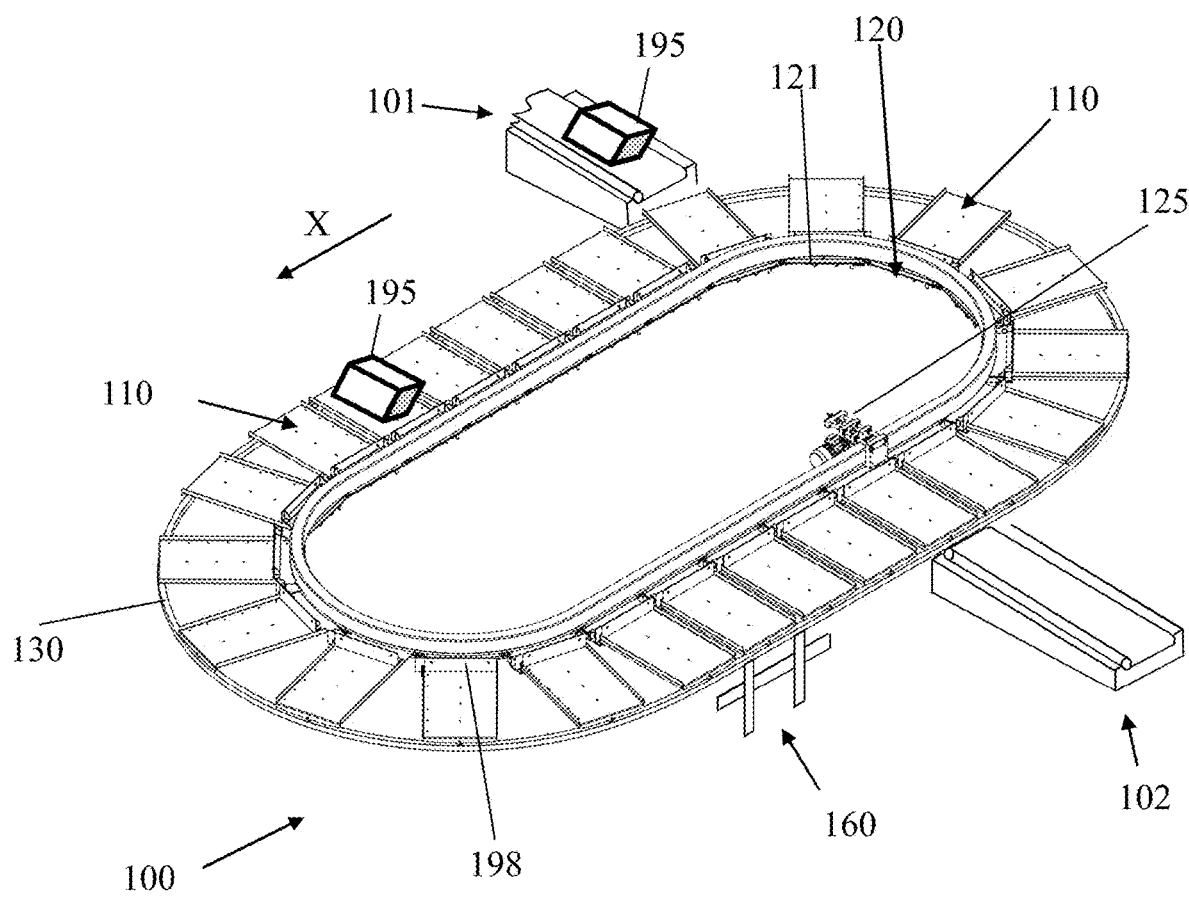
FIG. 1 is a first example of a weighing system.

FIG. 1 shows a weighing system 100 according to the invention. In the example depicted in FIG. 1, the weighing system 100 comprises a plurality of containers 110, the present example a tray 110, connected to a conveyor means 120. In the present example the conveyor means 120 comprises an array of concatenated conveyor bars 121 mutually hingedly connected to form an endless chain. The conveyor means also comprises an actuator 125 to drive the conveyor bars 120.

Each conveyor bar 121 is connected to a tray 110, such that the tray 110 connected to it is conveyed in an horizontal position in a conveying direction defining an axis X, as shown by an arrow in FIG. 1. For such purpose, in the present example, said trays 110 are also guided by a guide means 130 arranged in said weighing system 100. The tray 110 can be thus conveyed from a receiving section 101 to an outlet section 102 of the weighing system 100, and so does an item 195 being supported on top of the trays 110. In the present example, the item 195 may be pushed by a pushing organ 198 arranged in the tray 110 at the outlet section 102 depending on its weight, as will be explained below.

FIG. 1 also shows that the weighing system 100 comprises a weighing device 160 arranged under the path of the trays 110, a location of which is suitable for collecting data relating to the weight of the item 195 being transported by one tray 110.

Figure 2A:
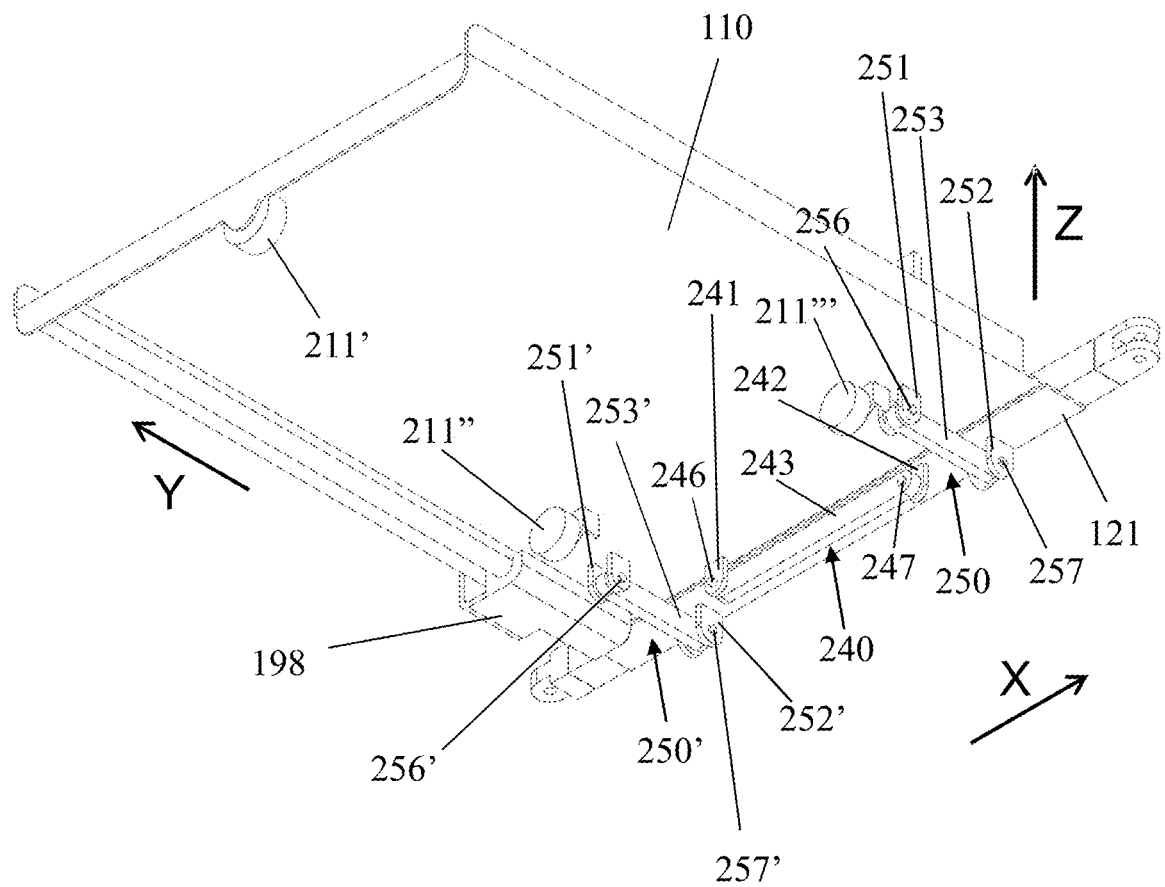
FIG. 2A is a first example of a container used in the weighing system of FIG. 1.

FIG. 2A shows a bottom view of a first embodiment of a tray 110 connected to the conveyor means 120 of the weighing system 100 depicted in FIG. 1. The tray 110 is connected to the conveyor bar 121 via a primary connecting means 240, a secondary connecting means 250 and a further secondary connecting means 250'.

The primary connecting means 240 comprises a primary first section 241 permanently connected to the tray 110, a primary second section 242 permanently connected to the conveyor bar 121, and a primary third section 243. The primary third section 243 comprises a primary first pin 246 arranged within a primary first opening of the primary first section 241. The cooperation of the primary first pin 246 and the primary first opening allows for hingedly connection of said primary third section 243 with the primary first section 241. Similarly, said primary third section 243 is hingedly connected to the primary second section via a primary second pin 247 of said primary third section 243 and arranged within a primary second opening of said primary second section 242.

In this first embodiment, the secondary connecting means 250 comprises a secondary first section 251, a secondary second section 252 and a secondary third section 253. The secondary third section 253 also comprises a secondary first pin 256 and a secondary second pin 257. In this way, the secondary third section 253 is hingedly connected to the secondary first section 251 via a secondary first opening arranged in said secondary first section 251 and to the secondary second section 252 via a secondary second opening arranged in said secondary second section 252. Similarly, the further secondary connecting means 250' comprises a secondary first section 251', a secondary second section 252' and a secondary third section 253' hingedly connected to the secondary first section 251' by the cooperation of a secondary first pin 256' and secondary first opening and hingedly connected to the secondary second section 252' by the cooperation of a secondary second pin 257' and a secondary second opening.

As depicted in FIG. 2A, the primary connecting means 240 is arranged such that the longitudinal of both the primary first pin 246 and the primary second pin 247 are parallel with respect to an axis Y transverse to the axis X. Thus, the primary third section 243 is capable of rotating about an axis also transverse to said conveying axis X and parallel to the axis Y. On the other hand, secondary connecting means 250 and 250' are arranged such that the longitudinal of the secondary first pins 256 and 256' and the secondary second pins 257 and 257' are parallel with respect to the axis X. Thus, the secondary third sections 253 and 253' are capable of rotating about an axis substantially parallel to said axis X. Further, the pushing organ 198 may move along the axis Y.

Figure 2B:
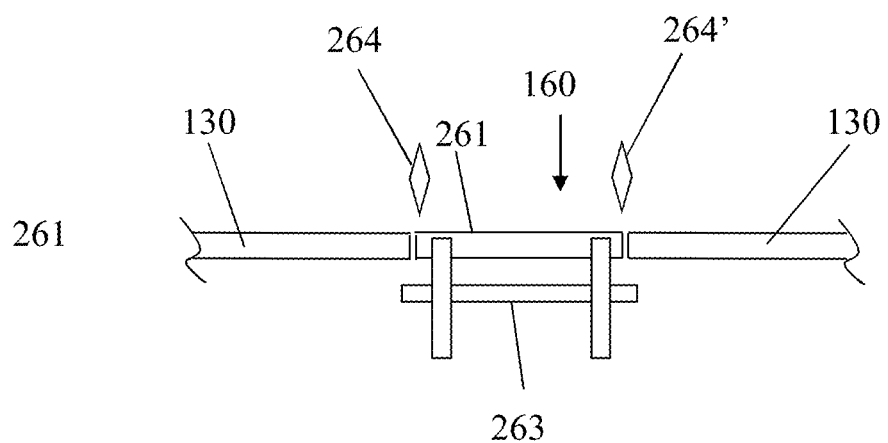
FIGS. 2B and 2C is a view of a weighing device used in the weighing system of FIG. 1.

FIG. 2B shows a lateral side view of a section of the guiding means 130 before and after the weighing device 160. As depicted, the weighing device 160 forms a weighing area 261 supported by a frame 263. The weighing area 261 is arranged for weighing the items 195 supported on top of the trays 110. At both sides of the weighing area 261 two photoelectric cells 264 and 264' may be arranged to cooperate with the weighing device 160, as will be explained below. In the present example, the weighing device 160 is also in communication with a processing unit (not shown) connected to an actuator (not shown). The functions of them will be explained later.

Figure 2C:
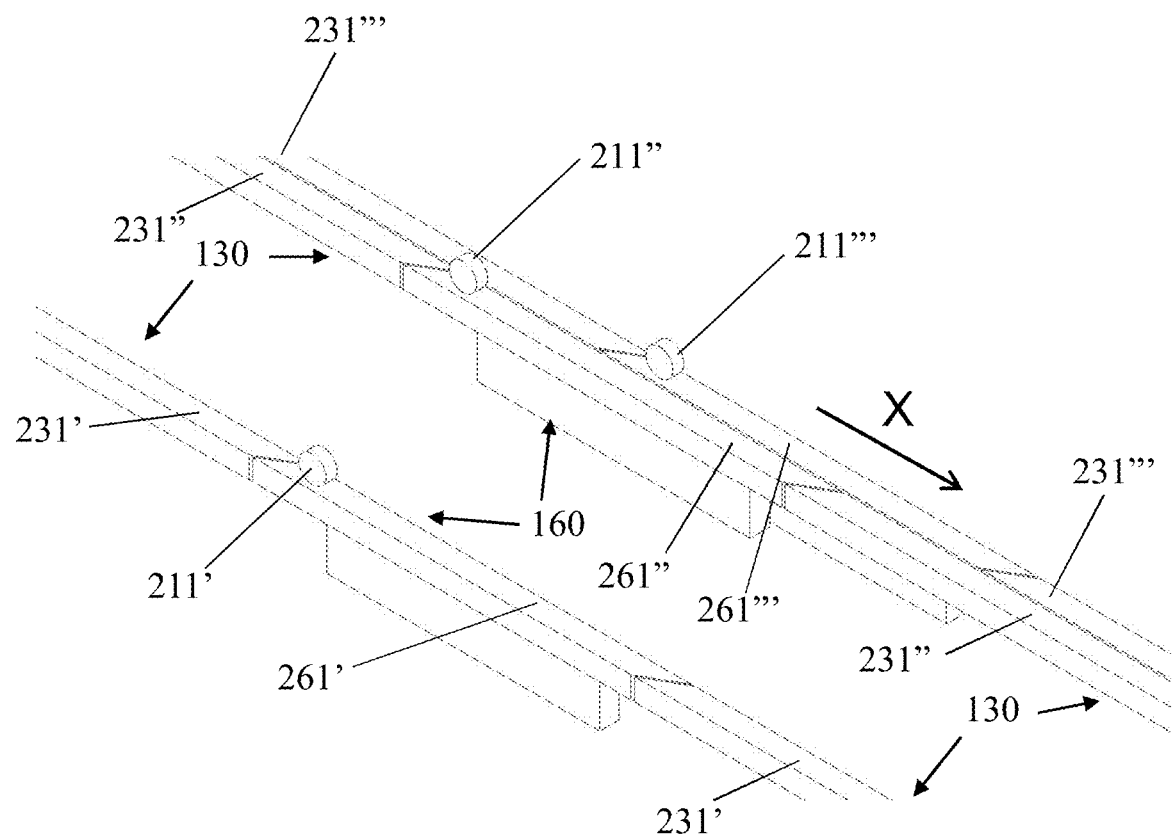

The tray 110 of the first embodiment comprises a first wheel 211', a second wheel 211" and a third wheel 211'" (see FIG. 2A). These wheels are arranged are arranged in the tray 110 to cooperate with the guide means 130 of the weighing system 100. FIG. 2C shows a top view of the section of the guide means 130 depicted in FIG. 2B and the wheels 211', 211" and 211'" of the tray 110 (the tray 110 itself is not depicted for the sake of clarity). The guide means 130 comprises a first rail 231' for receiving the first wheel 211', a second rail 231" that receives the second wheels 211" and a third rail 231' that receives the third wheel 211". In this way, the cooperation allows for supporting the tray 110 in a stable arrangement while said tray 110 is being conveyed via the conveyor means 120. Further, the cooperation allows for supporting the tray 110 in a first vertical position with respect to the conveyor bar 121 when being conveyed towards the weighing device 160.

As depicted in FIG. 2C, the weighing area 261 comprises a first rail 261' a second rail 261" and a third rail 261'". The rail 261' prolongs from the first rail 231' in the conveying direction and, therefore, receives the wheel 211'. Similarly the rail 261" and the rail 261'" receive the second wheel 211" and third wheel 211'" respectively. In this way, when said wheels 211', 211" and 211'" are supported on these rails 261', 261" and 261'" the weight of the tray 110 may be determined by the weighing device 160. The controller of the weighing device 160 may determine the moment at which the weight is measured using data from the photoelectric cells 264 and 264' about the presence of the tray 110 and the item 195 to be weighed in the rails 261', 261" and 261'". It is important to note that other means may be used for the detection of the tray, for example by use in combination of an encoder and a proximity switch.

The tray 110 may move in a vertical direction along an axis Z transverse to the conveying direction independently with respect to the conveyor bar 121 by the rotation of the primary third section 243, the secondary third section 253 and the further secondary third section 253' when being conveyed (see FIG. 2A). Thus, since the weight of the tray 110 is determined when the wheels are supported on the rails 261', 261" and 261'" due to the load in the vertical direction caused by the weight of the tray 110 itself and the item 195 being supported, the weighing device may determine the weight. Further, an effect that the conveyor bar 121 may cause on the load is negligible.

The movement that the tray 110 may suffer along the axis X as said tray 110 is being conveyed in the conveying direction is reduced by the primary first and second pins 246 and 247. Also, the movement of the tray 110 along the axis Y is reduced by the secondary first and second pins 256 and 257 and the further secondary first and second pins 256' and 257'. In this way, the rotation in the plane defined by weighing area 261 is reduced, and the weight obtained by the weighing device 160 is more accurate.

In a following stage not depicted, the tray 110 reaches the guide means 130 again to reach the first vertical position. Then it is conveyed to the outlet section 102 of the weighing system 100. There, depending on the weight of the item 195 determined by the controller, the pushing organ 198 is actuated to deliver the item 195 out of said tray 110.

FIG. 3A shows the tray 110 connected to the conveyor bar 121 via a primary connection means 240 as explained above and a second example of a secondary connecting means 350 and a further secondary connecting means 350'. Since both the secondary connecting means 350 and the further secondary connecting means 350' are identical, only the latter will be explained in detail.

As shown in FIG. 3A, the further secondary connecting means 350' is a secondary connecting means 250 as depicted in FIG. 2A although further comprising a secondary fourth section 354' and a secondary fifth section 355'. The secondary fourth section 354' extends from the secondary first section 251' and comprises a further pin 357'. The secondary fifth section 355' extends from the secondary second section 252' and comprises a further opening 358' oversized with respect to the size of the further pin 357'.

As depicted in FIGS. 3B and 3C, the secondary fourth section 354' and the fifth section 355' cooperate together via the further pin 357' and the further opening 358'. FIG. 3B depicts the secondary fourth section 354' being supported by the secondary fifth section 355' when the further pin 357' is fixed within a recess 359' arranged in said further opening 358'. In this way, the rotation of the secondary third section 253' is prevented and the tray 110 may be supported in a fixed position (FIG. 3B). In the fix position the movement of the tray 110 with respect to the conveyor bar 121 in the axis Z is avoided unless the tray is moved upwardly with respect to said conveyor bar 121 such that the further pin 357' leaves the recess 359' and is arranged within the oversized further opening 358', providing an unfixed position as depicted in FIG. 3B.

Figure 4A:
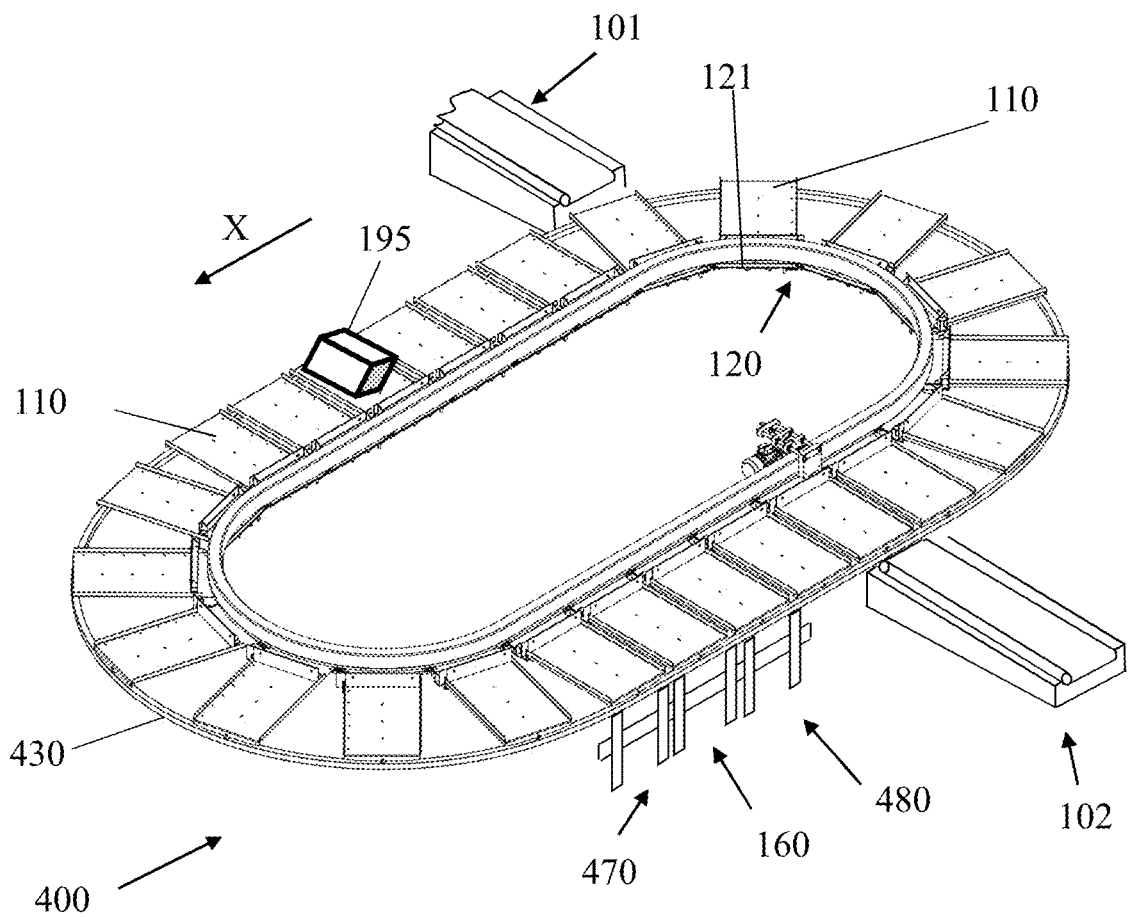
FIGS. 4A, 4B and 4C is a second example of a weighing system using the container depicted in FIGS. 3A, 3B and 3C.

The tray 110 comprising such a secondary connecting means 350 and 350' may be used in a weighing system 400 (see FIG. 4A). Said tray 110 may be thus conveyed in the first vertical position while being supported by a guide means 430. The guide means 430 comprises only one rail 431 for supporting the first wheel 211' of the tray 110. This means that the wheels 211" and 211'" need not to be supported because the system 430 is arranged such that the rail 431 support the tray 110 in the fixed position (see FIG. 4C).

Since the tray 110 is fixed to the conveyor bar when being conveyed in the first vertical position, said try has to be moved upwardly from said fixed position to be weighed by the weighing device 160. This is achieved by the lifting device, as depicted in FIGS. 4A, 4B and 4C.

The lifting device 470 is arranged upstream the weighing device 160 in the conveying direction (see FIG. 4A). It comprises a receiving area 471 supported by a frame 473 (see FIG. 4B). In the conveying direction, the receiving area 471 defines a positive slope towards the weighing area 261, said receiving area 471 being thus adjacent to the weighing area 261.

Figure 4B:
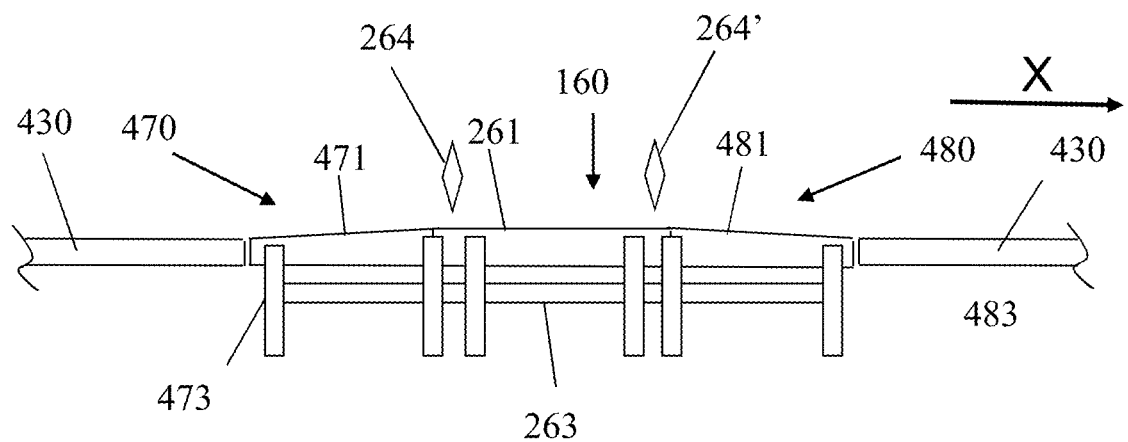
Figure 4C:
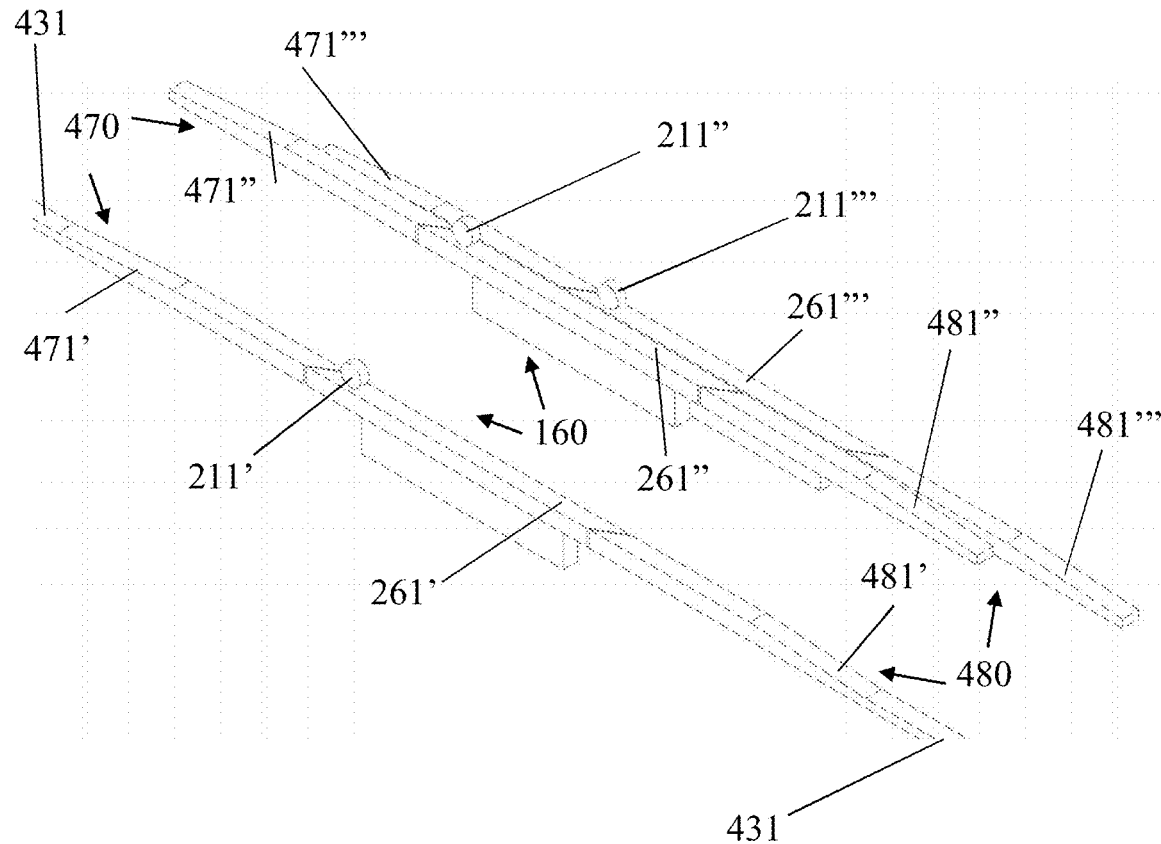

As depicted in FIG. 4C, the receiving area 471 comprises rails 471', 471" and 471'" arranged for receiving the wheels 211, 211" and 211'" of the tray 110 and for moving them upwardly such that said tray 110 is moved also upwardly with respect to the conveyor bar 121 to reach the unfixed position when being supported by the weighing area 261. In this way, the weight of the tray 110 supporting the item 195 is weighed by the weighing device 160 in the unfixed position, and the effect of the conveyor bar 121 on the load generated by the weight if said tray 110 and the item 195 on the weighing area 261 is negligible.

As depicted in FIGS. 4A, 4B and 4C, the weighing system 400 also comprises a setting-down device 480 arranged downstream the weighing device 160 in the conveying direction. The setting-down device 480 comprises a frame 483 for supporting a setting-down area 481 arranged such that in the conveying direction X said setting-down area 481 defines a negative slope starting beside the weighing area 261. As the tray 110 is being conveyed in the conveying direction, said tray 110 arrives at the setting-down device 480 from the weighing device 160. At this stage, rails 481', 481" and 481''' defining said setting-down area 481, guide the wheels 211', 211" and 211''' downwardly from the when said tray is being conveyed. Thus, a downward movement of the tray 110 with respect to the conveyor bar 121 is allowed due to gravity, said tray 110 reaching again the fixed position.

It is important to note that in a different example not depicted, the secondary connecting means 350 and 350" may support the tray 110 without need of using a guide means 130 or 430 since the tray 110 is supported in the fixed position. Thus a weighing system with no guide means may be used, said weighing system comprising at least a lifting device and, advantageously, a setting-down device.

Figure 5:
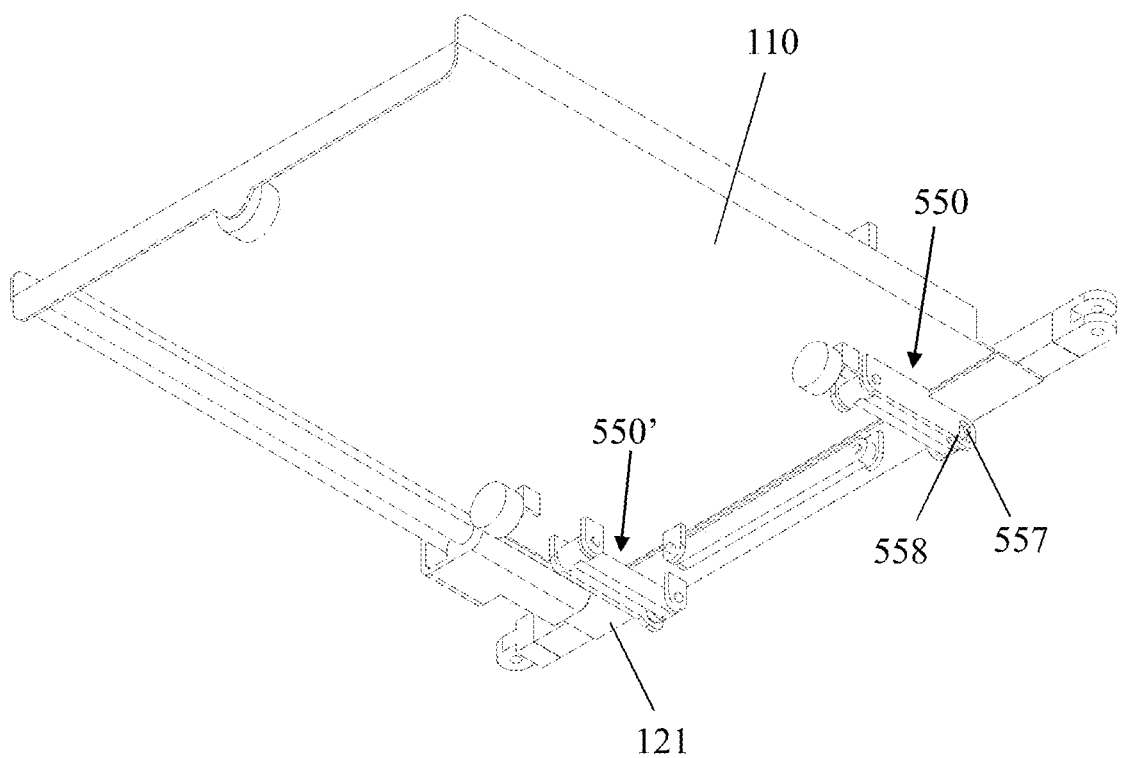
FIG. 5 is a third example of a container.

FIG. 5 shows a different example of a tray 110 connected to a conveyor bar 121 via a secondary connecting means 550 and a further secondary connecting means 550'. Since both of them are identical, only the secondary connecting means 550 will be explained in detail.

A second opening 558 of the secondary connection means 550 is designed elongated in the axis Z such that said second opening allows the second pin 557 moving within said second opening. In this way the tray 110 may move in the vertical direction with respect to the conveyor bar 121.

Figure 6:
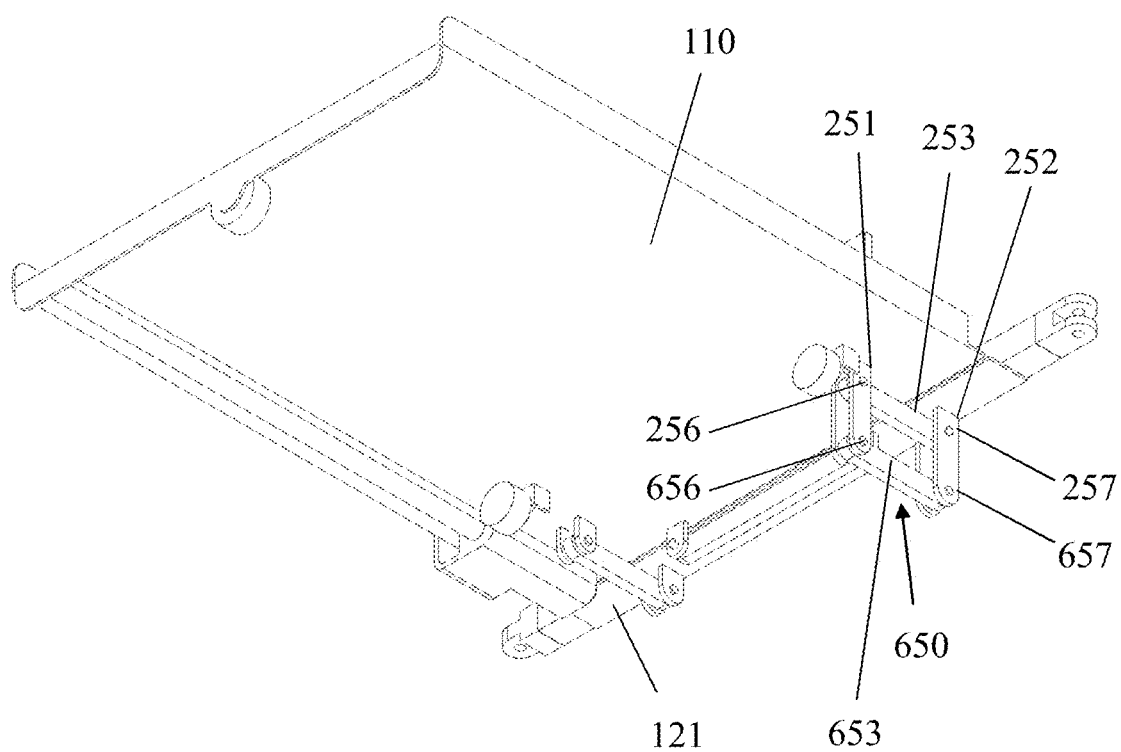
FIG. 6 is a fourth example of a container.

FIG. 6 shows another example of a container comprising a secondary connecting means 650. Said secondary connecting means also connects the tray 110 to the conveyor bar 121. The secondary connecting means 650 is a secondary connecting means 250 further comprising a further secondary third section 653 arranged in a parallelepiped arrangement with respect to the third section 253 via a further secondary first pin 656 and a further secondary second pin 657 of said secondary connecting means. The parallelepiped arrangement constrain rotation of the tray 110 about the axis X caused by the load provided by the item 195 when being conveyed, for example when used in the weighing system 400.

The invention claimed is:

1. A weighing system for weighing an item when being conveyed from a receiving section to an outlet section, the weighing system comprising:
   at least one container for transporting the item;
   a conveyor means connected to the container for conveying in a conveying direction said container at a first vertical position relative to the conveyor means; and
   a weighing device for weighing the container when said container is being conveyed supported on said weighing device;
   wherein the container is connected to the conveyor means via a primary connecting means and a secondary connecting means, each of the two connecting means comprising a first section permanently connected to the container, a second section permanently connected to the conveyor means, and a third section hingedly connected to both the first section and the second section;
   and wherein both connecting means are arranged such that the third section of the primary connecting means is rotatable about a first axis transverse to the conveying direction and the third section of the secondary connecting means is rotatable about a second axis substantially parallel to said conveying direction such that the rotation of said third sections about the first axis and the second axis respectively allows for movement of the container with respect to the conveyor means in a vertical direction from the first vertical position to a second vertical position.

2. The weighing system according to claim 1, wherein for the primary connecting means and the secondary connecting means, the third section is hingedly connected to the first section via a first pin arranged within a first opening and the second section via a second pin arranged within a second opening; wherein for the primary connecting means the first pin and the second pin are arranged transverse to the conveying direction and wherein for the secondary connecting means the first pin and the second pin are substantially parallel to said conveying direction.

3. The weighing system according to claim 2, wherein the second opening of the secondary connection means is designed such that said second opening elongates in a third axis transverse to both the first axis and the second axis such that the second pin of said secondary connection means is capable of moving within said second opening when the container moves between the first vertical position and the second vertical position.

4. The weighing system according to claim 1, wherein the secondary connecting means comprises a further third section also hingedly connected to both the first section and the second section of said secondary connecting means and said further third section is in a parallelepiped arrangement with respect to the third section of said secondary connecting means.

5. The weighing system according to claim 1, wherein at least one of the primary connecting means or the secondary connecting means comprises a fourth section extending from the first section and a fifth section extending from the second section, the fourth section and the fifth section being designed for cooperating together via a further pin and a further opening oversized with respect to the further pin, the further opening also comprising a recess, such that when the container is at the first vertical position the fourth section is supported by the fifth section via the pin fixed within the recess and such that when the container moves towards the second vertical position said fourth section is released from said fifth section as the pin is arranged within the further opening, said second vertical position being higher than the first vertical position; and wherein the weighing system comprises upstream relative to the weighing device a lifting device for moving the container relative to the conveyor means from the first vertical position towards the second vertical position such that said container is conveyed supported on the weighing device in said second vertical position.

6. The weighing system according to claim 5, wherein the lifting device comprises a frame, the frame comprising a receiving area adjacent to the weighing device, said receiving area configured, when the container is being conveyed, for
   i) receiving the container in the first vertical position and;
   ii) guiding said container upwardly towards the second vertical position such that the further pin is moved out of the recess towards the oversized further opening.

7. The weighing system according to claim 5, wherein the weighing system further comprises a setting-down device arranged adjacent to the weighing device, the setting-down device comprising a frame, the frame comprising a setting-down area configured, when the container is being conveyed by the conveyor means, for
   i) receiving the container in the second vertical position from the weighing device and;

ii) guiding said container from the second vertical position towards the first vertical position such that the further pin is fixed in the recess.

8. The weighing system according to claim 1, wherein the primary connecting means and the secondary connecting means are arranged such that the second section of said primary connecting means is opposite to said secondary connecting means and wherein the container comprises a further secondary connecting means arranged opposite to the first section of the primary connecting means.

9. The weighing system according to claim 1, wherein the container further comprises rolling means for supporting said container on the weighing device and for cooperating with the conveyor means for conveying said container while being supported on the weighing device.

10. The weighing system according to claim 9, wherein the weighing system further comprises guide means arranged in cooperation with the rolling means for supporting said container in the first vertical position when being conveyed.

11. The weighing system according to claim 6, wherein the weighing system further comprises guide means arranged in cooperation with the rolling means for supporting said container in the first vertical position when being conveyed, wherein the guide means is arranged in cooperation with the lifting device such that the receiving area receives the container via the rolling means.

12. The weighing system according to claim 7, wherein the weighing system further comprises guide means arranged in cooperation with the rolling means for supporting said container in the first vertical position when being conveyed, wherein the guide means is arranged in cooperation with the setting-down device such that said guide means receives, from said setting-down area, the container via the rolling means.

* * * * *